United States Patent
Carlos

(10) Patent No.: US 8,186,436 B2
(45) Date of Patent: May 29, 2012

(54) THERMAL INSULATING PACKER FLUID

(76) Inventor: Warren Carlos, Katy, TX (US)

(*) Notice: Subject to any disclaimer, the term of this patent is extended or adjusted under 35 U.S.C. 154(b) by 257 days.

(21) Appl. No.: 12/557,034

(22) Filed: Sep. 10, 2009

(65) Prior Publication Data

US 2011/0056682 A1   Mar. 10, 2011

(51) Int. Cl.
E21B 36/00 (2006.01)
(52) U.S. Cl. ........................................................ 166/302
(58) Field of Classification Search .................. None
See application file for complete search history.

(56) References Cited

U.S. PATENT DOCUMENTS

| | | | |
|---|---|---|---|
| 4,381,241 A | 4/1983 | Romenesko et al. | |
| 4,421,656 A | 12/1983 | Donatelli et al. | |
| 4,528,104 A * | 7/1985 | House et al. | 507/233 |
| 4,877,542 A | 10/1989 | Leon et al. | |
| 5,358,565 A | 10/1994 | Shu | |
| 5,630,474 A | 5/1997 | Burger et al. | |
| 5,707,939 A * | 1/1998 | Patel | 507/127 |
| 5,712,228 A | 1/1998 | Patel | |
| 6,251,837 B1 | 6/2001 | Meyer et al. | |
| 6,642,184 B1 | 11/2003 | De Ridder | |
| 6,908,886 B2 * | 6/2005 | Jones et al. | 507/112 |
| 7,219,735 B2 * | 5/2007 | Smith et al. | 166/305.1 |
| 2004/0087448 A1 | 5/2004 | Smith et al. | |
| 2007/0027245 A1 * | 2/2007 | Vaidya et al. | 524/424 |
| 2007/0149412 A1 * | 6/2007 | Leggett et al. | 507/235 |
| 2008/0087429 A1 * | 4/2008 | Brannon et al. | 166/280.1 |
| 2010/0175880 A1 | 7/2010 | Wang et al. | |

FOREIGN PATENT DOCUMENTS

WO   2004025076   5/2004

OTHER PUBLICATIONS

Ruzhi Zhang, Synthesis of Poly(tetramethyl-m-silphenylenesiloxane), an elastomer or Enhance High-Temperature Stability, Jan. 30, 1997, Department of Chemisty and the Polymer Research Center, University of Cincinati, Ohio, 2513-2515.*

* cited by examiner

Primary Examiner — Angela M DiTrani
Assistant Examiner — Silvana Runyan
(74) Attorney, Agent, or Firm — Andrew W. Chu; Craft Chu PLLC

(57) ABSTRACT

A method for ensuring the integrity of a well comprises selecting a thermally insulating fluid as a packer fluid, pumping the thermally insulating packer fluid into an annulus of the well and insulating the well by controlling the heat transfer from the production tubing to the outer annuli. Controlling the heat transfer may also mitigate annular pressure buildup and thereby reduce the incidence of casing failure. In one embodiment of the invention, the thermally insulating fluid comprises a silicone-based fluid.

8 Claims, No Drawings

THERMAL INSULATING PACKER FLUID

FIELD OF THE INVENTION

The invention relates generally to low thermal conductivity packer fluids.

BACKGROUND OF THE INVENTION

During hydrocarbon production, heat escapes from the production tubing to outer annuli resulting in the formation of gas hydrates and wax deposits that result in a drop in the production rate. In other deepwater developments, the annuli become healed from the transfer of the bottom hole temperature up the well by the produced fluids. When heated, the fluids trapped in the annulus may expand thermally. This may result in the thermal expansion of the casing, which could potentially result in casing failure. The expansion of the trapped fluids may also cause annular pressure buildup between the intermediate and production casings. This can also result in the collapse of the production string, which might result in a collapse of the production tubing.

SUMMARY OF THE INVENTION

One embodiment of the invention relates to a method of ensuring the integrity of well casing of a target well, the method comprising selecting an insulating fluid having a low thermal conductivity, pumping the thermal insulating fluid into art annulus of the target well, and insulating the target well by mitigating heat transfer from the production tubing to outer annuli.

In another embodiment of the invention, a method for ensuring integrity of well casing of a target well comprises mitigating annular pressure buildup by selecting a thermal insulating fluid and pumping the thermal insulating fluid into an annulus of the target well, wherein the thermal insulating fluid comprises silicone fluids.

In one embodiment, the thermal insulating comprises silanes, siloxanes, polysilanes or polysiloxane based fluids. In another embodiment of the invention, the silicone fluid comprises partial mixtures of siloxanes. In yet another embodiment, the thermal insulating fluid consists essentially of silicone fluids.

The thermal insulating fluid, according to one or more embodiments of the invention, is non-toxic, non-corrosive and possesses the physical and chemical characteristics required for a packer fluid. Advantageously, the thermal insulating fluid has a thermal conductivity of from 0.06 to 0.09 btu/hr-ft-° F.

DETAILED DESCRIPTION

One or more embodiments of the invention relate to ensuring the integrity of a well casing. In one embodiment, annular heat loss due to thermal conductivity may be controlled by the appropriate selection of a packer fluid. The packer fluid is pumped into the annulus between the well casing and the well tubing. In one embodiment of the invention, the packer fluid has a low thermal conductivity of from 0.06 to 0.09 btu/hr-ft-° F. Controlling the annular heat transfer to the outer annuli may also ensure an increase in the production rate of wells.

Collapse of the production and/or intermediate casing may be caused by several factors, including leaks in the production casing connection, annular fluid expansion, casing wear, etc. Conventional practice on land, involves handling annular pressure buildup by bleeding off annular pressure as needed. However, this is not easily feasible in deepwater developments.

Deepwater drilling is carried out under very high bottom hole pressures and temperatures. The wells are very deep, stretching to several thousand meters in depth and drilling has to be carried out from over a thousand meters above the sea bed. During production of hydrocarbons, heat is transferred from the production zone to the annulus. Packers seal off the annular space between the production tubing and the well casing outside it. Hot oil that flows inside the tubing can cause the packer fluid to expand, rapidly building up the pressure inside the sealed annulus. This can occur during the well startup phase when the packer is cold or during well shutdown.

Annular pressure buildup poses risks to the integrity of the well. The failure of the outer casings may propagate inward, causing failures of inner casings and tubings. There have been several reported incidents of annular pressure buildup in the B, C or D outer annulus leading to catastrophic casing ruptures. In one embodiment of the invention, a method of ensuring the integrity of the well casing comprises mitigating annular pressure buildup by selecting and pumping a low thermal conductivity packer fluid into the annulus.

The thermal conductivity of conventional packer fluids is from between 0.14 to 0.30 btu/hr-ft-° F. One or more embodiments of the invention relate to extremely low thermal conductivity packer fluids. In one embodiment, the packer fluids of the invention comprise a silicone base. The thermal conductivity of the silicone based packer fluids of the invention is from between 0.06-0.09 btu/hr-ft-° F.

The low thermal conductivity fluids of the present invention were compared to a conventional insulated packer fluid. The thermal conductivity of the tested conventional packer fluid was 0.25 btu/hr-ft-° F. while the thermal conductivity of the packer fluid of the invention was 0.07 btu/hr-ft-° F. The fluids were tested under similar bottom hole temperature and pressure conditions. The incremental annular pressure buildup (APB) pressure and APB volume data was collected in the drilling linen intermediate casing, production liner, production tieback and production tubing for each of the two fluids. As can be seen from the results below, the incremental APB pressure and APB volume is significantly lower with the silicone-based fluid of the invention due to its low thermal conductivity. Since it is well known that lowering the APB leads to lower incidence of casing failure, selecting the one or more embodiments of the thermal insulating fluid of the present invention, may result in lowering the risk of casing failure.

TABLE 1

| Conventional Packer Fluid – Thermal Conductivity = 0.25 btu/hr-ft-° F. | | |
|---|---|---|
| String Annulus | Incremental APB Pressure (psig) | Incremental APB Volume (bbl) |
| 16" Drilling Liner | 4199 | 23.4 |
| 14" x 13⅜" Intermediate Casing | 3571 | 32.4 |
| 10" Production Liner | 1014 | 0.1 |
| 10¾" x 10" Production Tieback | 3639 | 11 |
| 4½" Production Tubing | 0 | 13.7 |

TABLE 2

Silicone-based Packer Fluid – Thermal Conductivity = 0.07 btu/hr-ft-° F.

| String Annulus | Incremental APB Pressure (psig) | Incremental APB Volume (bbl) |
| --- | --- | --- |
| 16" Drilling Liner | 2234 | 12.1 |
| 14" × 13⅝" Intermediate Casing | 1866 | 16.6 |
| 10" Production Liner | 533 | 0 |
| 10¾" × 10" Production Tieback | 1940 | 5.9 |
| 4½" Production Tubing | 0 | 7.8 |

In one embodiment of the invention, the thermal insulating fluid comprises a solids-free, non-damaging and environmentally friendly fluid. In another embodiment of the invention, the thermal insulating fluid has a viscosity ranging from 0.65 to 1,000,000 mPa s. The thermal-insulating fluid has a molecular weight range from 162-160,000 dalton (Da). The physical and chemical properties of the thermal insulating fluid are stable over a wide temperature span, from −40° C. up to 350° C. making it suitable for the extreme conditions encountered in deepwater developments. In another embodiment of the invention, the thermal insulating fluid is temperature stable at 650° C.

The one or more embodiments of the thermal insulating fluid of the invention exhibit heat stability, oxidation resistance, very low vapor pressures, and a high flash point. Advantageously, the thermal insulating fluid has low to no toxicity, is non-corrosive and may be soluble in a wide range of solvents.

In one embodiment of the invention, the thermally insulating fluid comprises a silicone-based fluid. In another embodiment of the invention, the thermal insulating fluid consists essentially of silicone-based fluids. Silicone-based fluids are usually straight chains of polydimethylsiloxane, or PDMS, which are terminated with one or more trimethylsilyl group. PDMS fluids come in all viscosities—from water-like liquids to intractable fluids. This synthetic polymer has a repealing [(CH$_3$)$_2$SiO] unit. This is the basic building block of silicones. In one embodiment of the invention, the viscosity of the silicone-based fluid is designed so that it is easy to blend and pump into the annulus.

In one embodiment of she invention, the thermally insulating fluid comprises a silicone-based fluid and a bromide-based salt. The density of the thermally insulating fluid may be controlled by adjusting the amount of the bromide-based salt dispersed in the silicone-based fluid. In another embodiment of the invention, the thermally insulating fluid comprises silanes, siloxanes, polysilanes or polysiloxanes or combinations thereof. Various formulations of the thermally insulated fluid may achieved by the introduction of one or more organofunctional groups to the PDMS chain. All such formulations are encompassed within the scope of this invention.

The thermal insulating fluid of the invention may be used as a packer fluid in land-based wells, geothermal wells, offshore wells and deepwater developments, to control the heat transfer from the production tubing to the well bore, one or more internal annuli and the riser environment.

The invention has been described with respect to a limited number of embodiments. However, those skilled in the art may appreciate that the inventive concepts disclosed herein are capable of many modifications. To the extent such modifications fall within the scope of the appended claims and their equivalents, they are intended to be covered by this patent.

The invention claimed is:

1. A method of ensuring integrity of well casing of a target well comprising:
    selecting an insulating fluid, the insulating fluid being comprised of a silicone fluid, wherein the thermal insulating fluid has a thermal conductivity between 0.06-0.09 btu/hr-ft-° F., and wherein the thermal-insulating fluid has a molecular weight range from 162-160,000 dalton and wherein the thermal-insulating fluid is temperature stable at least till 350° C.;
    pumping the thermal insulating fluid into an annulus of the target well; and
    insulating the well by controlling heat transfer from production tubing to outer annuli.

2. The method of claim 1, wherein the silicone fluid is selected from a group consisting of: dimethyl silicone, methylphenyl silicone and methylhydrogen silicone.

3. The method of claim 1, further comprising mitigating annular pressure buildup.

4. The method of claim 1, wherein the thermal-insulating fluid has a viscosity between 0.65-1,000,000 mPa s.

5. The method of claim 1, wherein the thermal-insulating fluid is essentially unaffected by oxidation.

6. The method of claim 1, wherein the target well is selected from a group consisting of a deepwater well, an offshore well and a land-based well.

7. The method of claim 1, wherein the target well is comprised of a geothermal well.

8. The method of claim 1, wherein the thermal-insulating fluid has a viscosity between 2500-12500 cSt.

* * * * *